(12) United States Patent
Bindell et al.

(10) Patent No.: US 6,425,189 B1
(45) Date of Patent: Jul. 30, 2002

(54) PROBE TIP LOCATOR HAVING IMPROVED MARKER ARRANGEMENT FOR REDUCED BIT ENCODING ERROR

(75) Inventors: Jeffrey B. Bindell; Erik C. Houge, both of Orlando; Larry E. Plew, St. Cloud; Frederick A. Stevie, Orlando, all of FL (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/552,892

(22) Filed: Apr. 20, 2000

Related U.S. Application Data

(63) Continuation-in-part of application No. 09/196,827, filed on Nov. 20, 1998, now Pat. No. 6,178,653.

(51) Int. Cl.[7] .............................. G01B 9/00; G01B 5/00
(52) U.S. Cl. ............................. 33/555; 33/502; 33/706
(58) Field of Search .......................... 33/555, 502, 503, 33/706, 707, 708, 1 BB, 613, 645, 533

(56) References Cited

U.S. PATENT DOCUMENTS

| | | | | | |
|---|---|---|---|---|---|
| 3,600,811 | A | * | 8/1971 | Weyrauch | 33/707 |
| 3,916,528 | A | * | 11/1975 | Eisenkopf | 33/706 |
| 4,409,479 | A | * | 10/1983 | Sprague et al. | 33/707 |
| 4,530,159 | A | * | 7/1985 | Ernst | 33/707 |

* cited by examiner

Primary Examiner—Christopher W. Fulton

(57) ABSTRACT

A probe tip locator for, and method of, use in determining a location of a probe tip relative to the probe tip locator comprising sets of discrete location markers in which numbers and positions of the location markers in each of the sets are employable uniquely to identify corresponding specific locations on the probe tip locator, the sets being distributed about the probe tip locator to avoid unbalanced partial encroachments into both sides of a scanpath of the probe tip by location markers in sets normally adjacent the scanpath thereby to prevent an erroneous determination of location caused by unbalanced partial encroachments of the location markers into both sides of the scanpath as the probe tip traverses the scanpath.

21 Claims, 6 Drawing Sheets

FIG. 5

| | | | |
|---|---|---|---|
| 1111111 | 1111001 | 1111000 | 1111110 |
| 0111111 | 0111001 | 0111000 | 0111110 |
| 0011111 | 0011001 | 0011000 | 0011110 |
| 1011111 | 1011001 | 1011000 | 1011110 |
| 1001111 | 1001001 | 1001000 | 1001110 |
| 0001111 | 0001001 | 0001000 | 0001110 |
| 0101111 | 0101001 | 0101000 | 0101110 |
| 1101111 | 530 — 1101001 | 1101000 | 1101110 |
| 1100111 | 1100001 — 540 | 1100000 | 1100110 |
| 0100111 | 0100001 | 0100000 | 0100110 |
| 0000111 | 0000001 | 0000000 | 0000110 |
| 1000111 | 1000001 | 1000000 | 1000110 ← 500 |
| 1010111 | 1010001 | 1010000 | 1010110 |
| 0010111 | 0010001 | 0010000 | 0010110 |
| 0110111 | 0110001 | 0110000 | 0110110 |
| 1110111 | 1110001 | 1110000 | 1110110 |
| 1110011 | 1110101 | 1110100 | 1110010 |
| 0110011 | 0110101 | 0110100 | 0110010 |
| 0010011 | 0010101 | 0010100 | 0010010 |
| 1010011 | 1010101 | 1010100 | 1010010 |
| 1000011 | 1000101 | 1000100 | 1000010 |
| 0000011 | 0000101 | 510 — 0000100 | 0000010 |
| 0100011 | 0100101 | 0100100 — 520 | 0100010 |
| 1100011 | 1100101 | 1100100 | 1100010 |
| 1101011 | 1101101 | 1101100 | 1101010 |
| 0101011 | 0101101 | 0101100 | 0101010 |
| 0001011 | 0001101 | 0001100 | 0001010 |
| 1001011 | 1001101 | 1001100 | 1001010 |
| 1011011 | 1011101 | 1011100 | 1011010 |
| 0011011 | 0011101 | 0011100 | 0011010 |
| 0111011 | 0111101 | 0111100 | 0111010 |
| 1111011 | 1111101 | 1111100 | 1111010 |

PROBE TIP LOCATOR HAVING IMPROVED MARKER ARRANGEMENT FOR REDUCED BIT ENCODING ERROR

CROSS-REFERENCE TO RELATED APPLICATION

The present application is a continuation-in-part of U.S. patent application Ser. No. 09/196,827, now U.S. Pat. No. 6,178,653, filed Nov. 20, 1998, entitled "Probe Tip Locator," commonly assigned with the present invention and incorporated herein by reference.

TECHNICAL FIELD OF THE INVENTION

The present invention is directed, in general, to location systems and, more specifically, to a system and method for locating a probe tip (or any other object) relative to a locator made up of markers. The arrangement of markers in the locator is such that bit encoding errors that may occur as the probe tip or other object scans the locator are reduced or eliminated.

BACKGROUND OF THE INVENTION

It has always been desirable to test integrated circuits (ICs) to determine whether they have been manufactured properly. While scanning electron microscopes have been available for such testing, they require a sample to be sectioned and thus destroyed. Nondestructive testing is preferred by far. Stylus, or scanning probe, microscopes offer an opportunity to perform such nondestructive testing.

Unfortunately, the device and interconnect structures that make up today's ICs have become so small that, when attempting to probe an IC sample with a scanning probe microscope, it has become difficult to determine where exactly the tip of the microscope's probe is located relative to the sample. Ignorant of the exact relative location of the probe tip, signals that the probe tip returns as it scans structures in the sample lose their meaning and become uninterpretable. Lacking a proper interpretation, the scanned structures cannot be evaluated, and vital information that could have been used to improve the manufacturing processes employed to fabricate the IC is lost. As a consequence, IC yields drop and manufacturing time and cost rise.

Scanning probe microscopes are able to locate their probe tips relative to a sample with a degree of uncertainty (perhaps a few microns). Unfortunately, that degree of uncertainty has become unacceptably large relative to the size of the structures on the IC. To address this problem, probe tip locators have been developed to determine the location of the probe tip more precisely, i.e., reduce the degree of uncertainty to an acceptable level.

A probe tip locator is itself a structure that the probe can scan. The locator is placed on the stage of the microscope, along with the sample, at a location that is a known distance and direction from the sample. The locator is laid out such that a scan of the locator by the probe tip provides the information required to locate the probe tip relative to the locator. Having located the probe tip relative to the locator, and knowing the relative distance and direction between the locator and the sample, the location of the probe tip relative to the sample can be determined. As a result, the probe tip can be accurately placed on the sample, and the structures in the sample meaningfully analyzed.

Prior art probe tip locators typically used a single, large structure consisting of a first reference line parallel to a reference axis (for example, the y-axis) and a second reference line intersecting the first at a known angle. When a probe tip scanned the structure, it returned signals indicating the location of the first line (thereby fixing the locator with respect to, continuing the example, the x-axis) and the location of the second line. Knowing these locations and the speed at which the probe tip scanned the structure, the distance between the first and second lines is determinable. Since only one y-axis location could evidence such distance (and given that the angle of intersection is known), the locator is therefore theoretically fixed with respect to the y-axis. The probe tip is so located and sample analysis can begin.

By their nature, the first and second lines gradually separate as they depart their intersection point. This is unfortunate, since the probe tip is thus required to scan an ever-increasing distance to cross both lines as the line the probe tip scans (the "scan line") is separated from the intersecting point. Since scanning probe microscopes have limits on the length of the scan line their probe tips are able to traverse, and given that the probe tip must cross both lines, prior art probe tip locators were limited in terms of their size.

What is needed in the art is a probe tip locator that can allow the probe tip of a scanning probe microscope to be located to an acceptably small location within an acceptably large locator, such that manufacturing and testing of ICs (and, more broadly, monolithic circuits) are improved.

More generally, what is needed in the art is an improved way of locating any object relative to a locator based entirely on a knowledge of the layout of the locator and what the object encounters as the object traverses the locator.

SUMMARY OF THE INVENTION

As stated above, the present invention is related to U.S. patent application Ser. No. 09/196,827, now U.S. Pat. No. 6,178,653. That application sets forth two embodiments of a probe tip locator that overcome the deficiencies of the prior art probe tip locator discussed above.

The first embodiment employs a set of lines (or, more generically, "location markers") that form bit fields and neighboring intersecting lines that together cooperate to locate a probe tip relative to the locator. The second embodiment employs multiple sets of location markers that form bit fields that cooperate to locate a probe tip relative to the locator.

The markers are arranged in the bit fields to encode unique addresses for their respective locations. As a probe tip scans an unknown location on the locator, it produces signals that indicate the unknown location's address, revealing the location. Depending upon the number of bits in the bit fields and limited only by the resolution of the lines and the length of the path that the scanning probe microscope is able to accommodate, the probe tip can be located to an acceptably small location within an acceptably large locator.

Both embodiments happen to assign sequential addresses to adjacent locations. As advantageous as both embodiments are, this orderly assignment of addresses has caused a problem. As a probe tip scans along a scan line, it traverses an area roughly equaling its width multiplied by the length of the scan line. This area is hereinafter called a "scanpath." Since the probe tip has a finite width, its scanpath has a corresponding finite width, which means that a probe tip may, on occasion, traverse a scanpath that straddles two adjacent locations on the probe tip locator.

Should a probe tip's scanpath happen to straddle two adjacent locations, location markers from the two locations can interfere to cause the probe tip to produce a signal representing an address that corresponds to neither one of the two adjacent locations. A bit encoding error of this type is best described as "aliasing."

Aliasing produces an erroneous determination of the probe tip's location relative to the locator. This corrupts any further calculations or analysis that depends on knowledge of the location and ultimately prevents a proper interpretation of sample structures. Accordingly, an objective of the present invention is to reduce or eliminate the chance that aliasing can occur.

In the attainment of this objective, the present invention provides a probe tip locator for, and method of, use in determining a location of a probe tip relative to the probe tip locator. The probe tip locator includes sets of discrete location markers in which numbers and positions of the location markers in each of the sets are employable uniquely to identify corresponding specific locations on the probe tip locator. The sets are distributed about the probe tip locator to avoid unbalanced partial encroachments into both sides of a scanpath of the probe tip by location markers in sets normally adjacent the scanpath ("double-sided" unbalanced partial encroachments). This prevents an erroneous determination of location caused by unbalanced partial encroachments of the location markers into both sides of the scanpath as the probe tip traverses the scanpath.

The present invention therefore introduces the broad concept of arranging the sets of location markers that constitute a probe tip locator such that the sets do not encroach upon the scanpath and cause erroneous location indications. This arranging can be done in at least two alternative ways.

A first way calls for the sets to be spaced apart from one another by at least a width of the scanpath. The addresses of the locations then can be ordered in any manner, including sequentially.

A second way calls for the addresses to be ordered such that opposing state transitions (both 0→1 transitions and 1→0 transitions) between corresponding bit fields of locations normally adjacent all possible scanpaths are avoided. Thus ordered, further spacing is unnecessary. State transitions give rise to unbalanced partial encroachments; opposing state transitions give rise to the double-sided unbalanced partial encroachments that the present invention seeks to avoid.

The present invention enjoys substantial utility in that errors are reduced, increasing the reliability and decreasing the cost of manufacturing and testing monolithic circuits.

In one embodiment of the present invention, the location is a Cartesian location. The location may alternatively be polar or of any other conventional or later-discovered coordinate system.

In one embodiment of the present invention, the probe tip locator further includes reference markers distributed about the probe tip locator at predetermined ordinal locations thereon. The reference markers, while not necessary to the present invention, are employable to differentiate sets from one another in the ordinal direction (the direction of probe tip travel in the embodiment to be illustrated and described).

In one embodiment of the present invention, the location markers are bit fields. In an embodiment to be illustrated and described, the probe tip returns a binary signal representing at least a partial presence or a complete absence of the bit fields. Of course, those skilled in the art will perceive that many different types of markers, including those of varying dimension or shape, may be employed to advantage and remain within the broad scope of the present invention.

In one embodiment of the present invention, the sets of discrete location markers are first sets of discrete location markers, the probe tip locator further comprising second sets of discrete location markers cooperate with the first sets of location markers uniquely to identify two-dimensional specific locations on the probe tip locator. Thus, the present invention is not limited to a one-dimensional locator; it fully encompasses multidimensional locators wherein the number of sets cooperating to describe a particular location equals the number of dimensions included in the location.

In one embodiment of the present invention, the scanpath is linear. This need not be the case, however. The probe tip needs only to encounter such markers as necessary to determine its location, no matter how those markers are positioned relative to one another.

In one embodiment of the present invention, discrete markers are embodied in a structure on a monolithic substrate. Thus, the probe tip senses the relief. However, the probe tip may sense any physical characteristic associated with the location markers and is not limited to sensing relief.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention reference is now made to the following descriptions taken in conjunction with the accompanying drawings, in which:

FIG. 5 illustrates a list of location addresses ordered to avoid opposing state transitions (both 0→1 transitions and 1→0 transitions) between corresponding bit fields of adjacent addresses.

DETAILED DESCRIPTION

Figure 1:
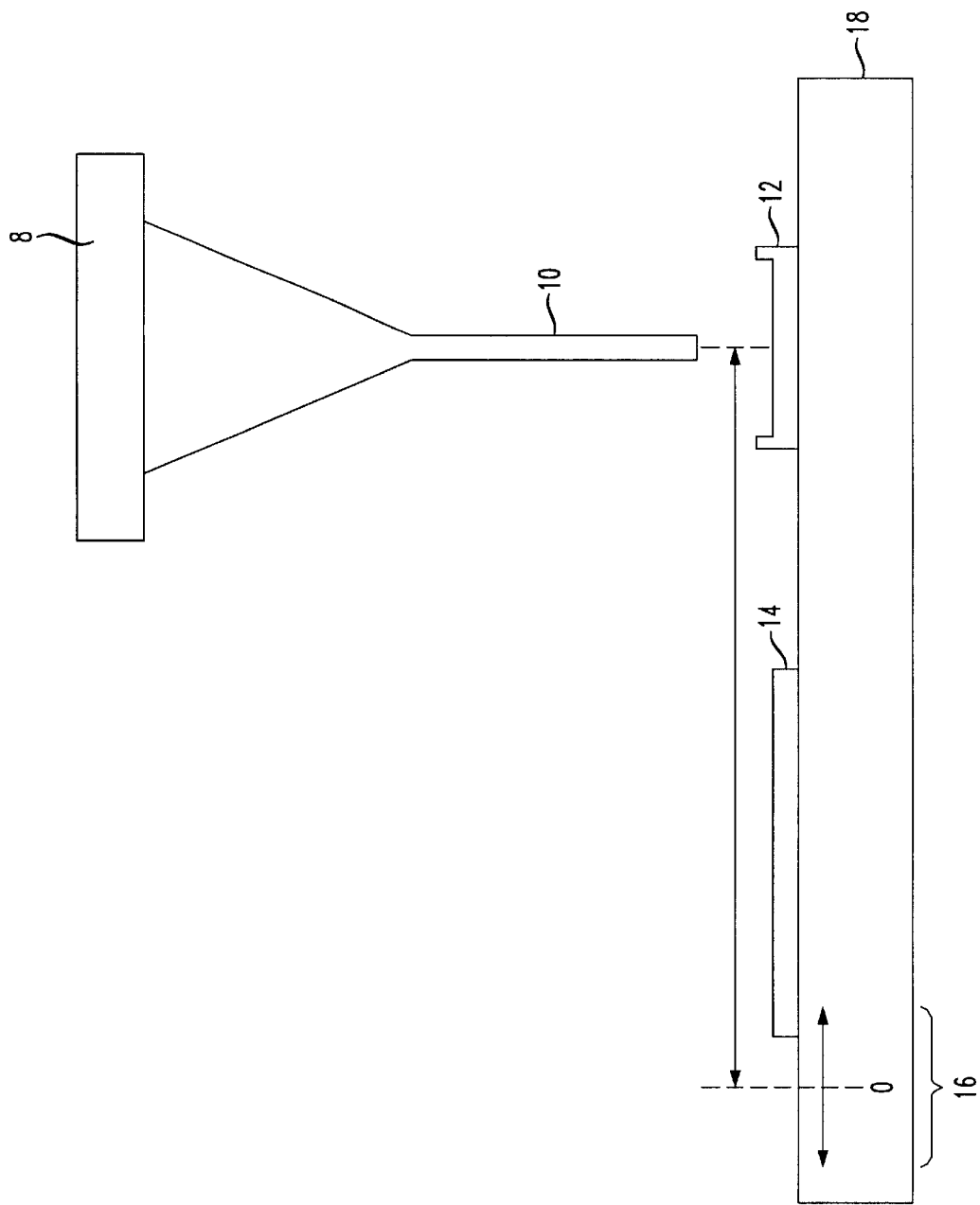
FIG. 1 illustrates a side elevational view of a scanning probe microscope having a probe tip mounted above a stage thereof that can accept a probe tip locator constructed according to the principles of the present invention.

Referring initially to FIG. 1, illustrated is a side elevational view of a scanning probe microscope, generally designated 9, that has a probe tip 10 mounted above a stage 18 thereof. The microscope 9 can accept a probe tip locator 12 constructed according to the prior art or, alternatively, constructed according to the principles of the present invention. As has been set forth in detail above, the latter proves substantially superior to the former.

The scanning probe microscope 9 is capable of accurately moving the probe tip 10 relative to the stage 18. However, the initial position of the probe tip 10 relative to the probe tip locator 12 must be determined using the probe tip 10 itself.

Once the initial position of the probe tip 10 is determined relative to a coordinate system 16 of the stage 18, and since the stage 18 maintains the distance and direction from the probe tip 10 to an adjoining sample 14 to be tested at a known and constant value, the distance and direction in which the microscope 9 must move the probe tip 10 can be calculated. The probe tip 10 can then be moved accordingly to a desired destination over the sample 14. The probe tip 10 is thus in position to scan the sample 14 as desired.

Figure 2:
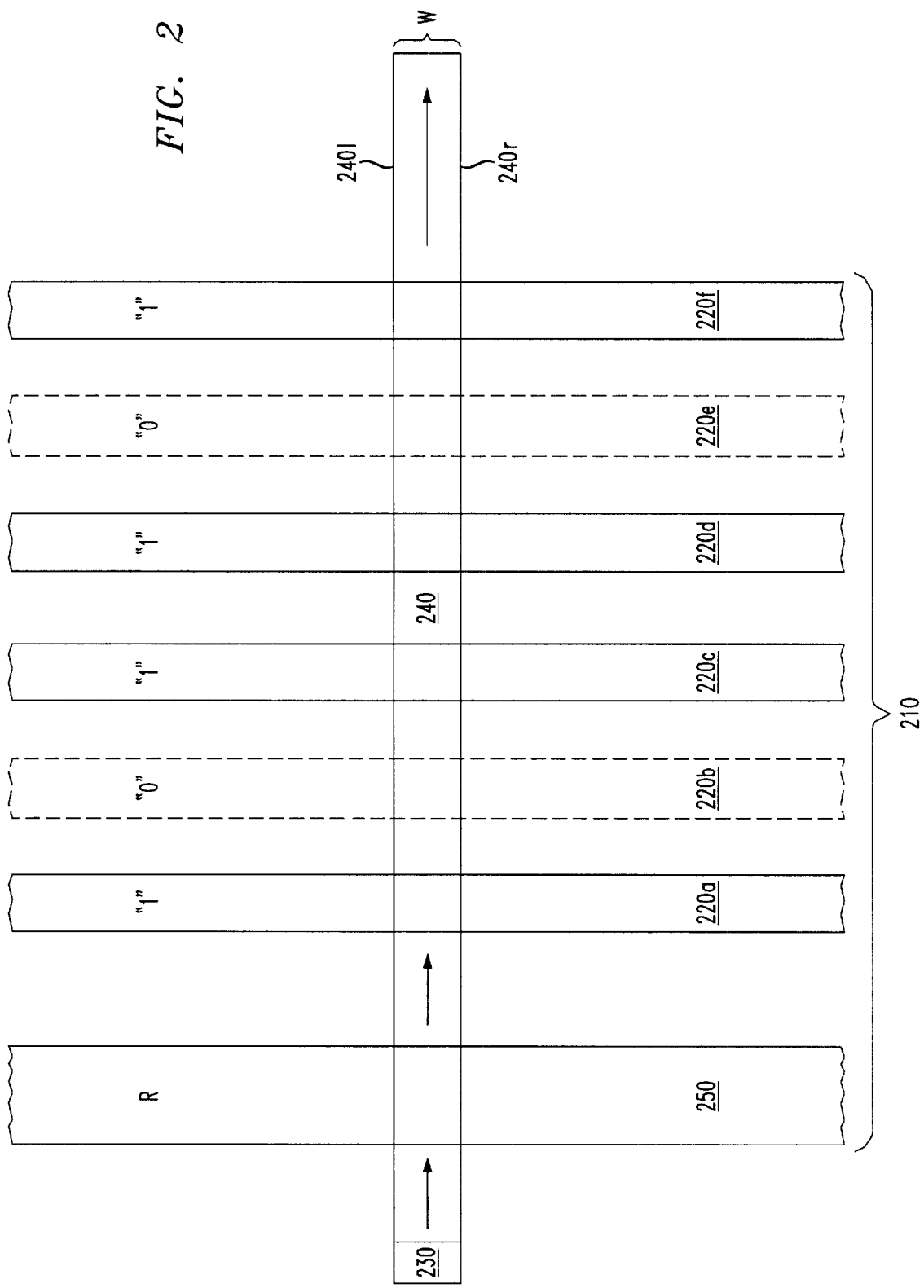
FIG. 2 illustrates a schematic view of a portion of an exemplary probe tip locator, a non-straddling scanpath and resulting full encroachment.

Turning now to FIG. 2, illustrated is a schematic view of a first portion of an exemplary probe tip locator 210. The probe tip locator 210 comprises a set of location markers 220a, 220c, 220d, 220f that are arranged to encode addresses corresponding to specific locations on the locator 210. The location markers 220a, 220c, 220d, 220f form at least a portion of a bit field (that also includes empty bit fields 220b, 220e, represented in phantom line, at which location markers are absent) that a probe tip 230 can scan to indicate its location relative to the probe tip locator 210.

The probe tip 230 is schematically represented as being located over the probe tip locator 210. The probe tip 230 is designed to move in a plane parallel to, and proximate, that of the locator 210. As the probe tip 230 moves, it detects variations in the structure on the underlying locator 210. More specifically, the probe tip 230 detects either the presence or the absence of the location markers 220.

Figure 3:
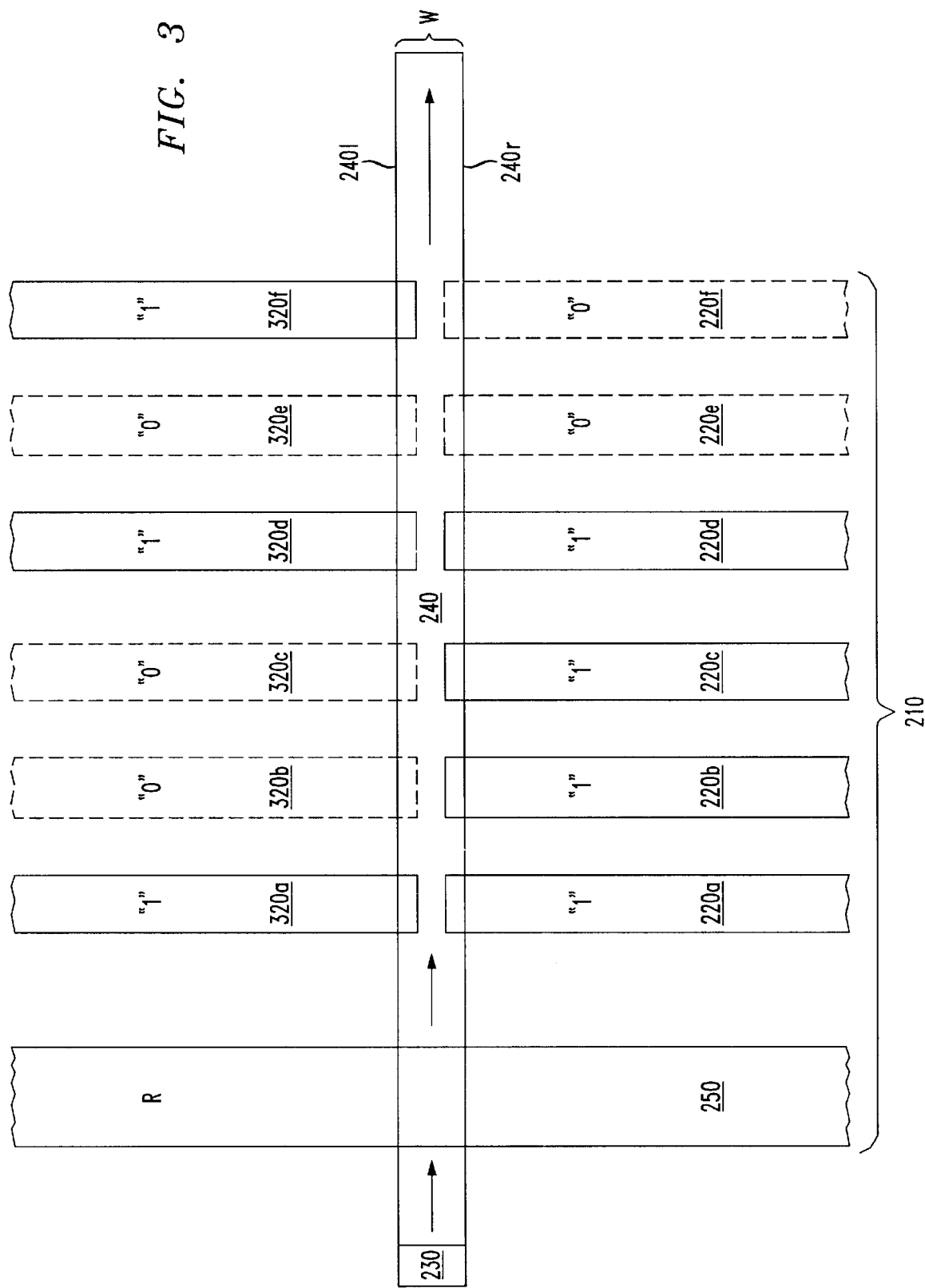
FIG. 3 illustrates a schematic view of a portion of an exemplary probe tip locator, a straddling scanpath and resulting partial encroachment.

The probe tip 230 produces an essentially binary signal indicating whether or not a location marker underlies it at a certain point in time. If a location marker does not underlie the probe tip 230, it produces a "0" signal. If a location marker even partially underlies the probe tip 230, it produces a "1" signal. The binary nature of the probe tip's signal, coupled with the fact that the probe tip 230 is of a finite width and that the probe tip 230 interprets a location marker only partially underlying it as a "1" gives rise to the bit encoding errors and resulting aliasing that the present invention addresses. FIGS. 2 and 3 together set forth this phenomenon in detail.

FIG. 2 shows a path along which the probe tip 230 is to scan during a given period of time. That path is termed a "scanpath" 240, has a width "w" and runs from left to right as illustrated (and indicated by directional arrows shown, but not referenced, within the scanpath 240).

The scanpath 240 initially crosses a reference line 250, causing the probe tip to produce a "1" signal of extended duration and indicating to one analyzing the signal that the probe tip 220 is about to encounter discrete location markers that will indicate the position of the probe tip 230. While the description that follows involves discrete location markers that take the form of lines, those skilled in the pertinent art will understand that markers of any form or shape are within the broad scope of the present invention.

Then, the scanpath 240 crosses (in left-to-right order) the location marker 220a, the empty bit field 220b, the location marker 220c, the location marker 220d, the empty bit field 220e and, finally, the location marker 220f. (At this point, it should be stated that the number of bit fields is often greater than the number shown in FIG. 2; the number is intentionally reduced for clarity's sake.)

The location markers 220a, 220c, 220d, 220f and the empty bit fields 220b, 220e cause the probe tip 230 to generate a corresponding signal: "1," "0," "1," "1, " "0" and "1." This signal yields, in effect, the address of the scanned location on the probe tip locator 210.

FIG. 2 represents a situation in which the scanpath 240 lies completely within one set of location markers 220a, 220c, 220d, 220f. One can readily see that each location marker 220a, 220c, 220d, 220f enters a left-hand side 240l of the scanpath and exits a right-hand side 240r of the scanpath 240. For purposes of the present invention, this is called a "full encroachment." Each location marker 220a, 220c, 220d, 220f has fully encroached upon the scanpath 240.

Full encroachment does not produce encoding errors or resulting aliasing. Thus, the signal: "1, " "0 ," "1, " "1,""0" and "1" represents the true address of the location of the probe tip 230 relative to the probe tip locator 210.

The present invention uniquely recognizes, however, that the scanpath 240 is not guaranteed to lie completely in one set of location markers. Indeed, the scanpath 240 may straddle two sets of location markers that are adjacent one another in a direction normal to the scanpath 240 ("normally adjacent" and vertical as illustrated). This circumstance and its detrimental consequences are the subject of FIG. 3.

Turning now to FIG. 3, illustrated is a schematic view of a portion of a second portion of an exemplary probe tip locator 210, a straddling scanpath 240 and resulting partial encroachment. FIG. 2 shows a first set of location markers 220a, 220b, 220c, 220d and empty bit fields 220e, 220f and a normally adjacent second set of location markers 320a, 320d, 320f and empty bit fields 320b, 320c, 320e.

By virtue of its width w, the scanpath 240 straddles the two sets. In fact, FIG. 3 illustrates the scanpath 240 as exactly straddling the two sets (not necessary for bit encoding errors to occur, however).

Were the scanpath to encounter only the first set of location markers 220a, 220b, 220c, 220d, the resulting signal would be "1," "1," "1," "1," "0" and "0" and would represent the true address of that lower location. Were, on the other hand, the scanpath to encounter only the second set of location markers 320a, 320d, 320f, the resulting signal would be "1," "0," "0," "1," "0" and "1" and would represent the true address of that upper location.

Instead, the probe tip 230 encounters ends of all of the location markers 220a, 220b, 220c, 220d, 320a, 320d, 320f, setting the stage for potential encoding errors. This will now be explained in detail.

The probe tip 230 is illustrated as first encountering the reference line 250. Next, the probe tip 230 concurrently encounters location markers 220a, 320a. The location marker 220a enters the right-hand side 240r of the scanpath 240, but terminates within the scanpath 240 instead of exiting the left-hand side 240l. The location marker 320a enters the left-hand side 240l of the scanpath 240, but terminates within the scanpath 240 instead of exiting the right-hand side 240r. For purposes of the present invention, this arrangement is called a "balanced partial encroachment"). Either location marker 220a, 320a would be sufficient to cause the probe tip 230 to produce a "1" signal, so the two location markers 220a, 320a are certainly sufficient. Consequently, the probe tip 230 produces a "1"

signal, which, so far, could represent the true address of either the upper or the lower location.

Then, the probe tip 230 encounters the location marker 220b and the empty bit field 220b. The location marker 220b enters the right-hand side 240r of the scanpath 240, but terminates within the scanpath 240 instead of exiting the left-hand side 240l. For purposes of the present invention, this arrangement is called a "right-side unbalanced partial encroachment") . The location marker 220b is sufficient to cause the probe tip 230 to produce a "1" signal. Consequently, the probe tip 230 produces a "1" signal, which, in combination with the earlier "1" signal, so far, could represent the true address of only the lower location (containing the location markers 220a, 220b, 220c, 220d) . This is acceptable, since the scanpath 240 does at least partially lie within the lower location.

Next, the probe tip 230 encounters the location marker 220c and the empty bit field 320c. Like the location marker 220b, the location marker 220c enters the right-hand side 240r of the scanpath 240, but terminates within the scanpath 240 instead of exiting the left-hand side 240l. This is another right-side unbalanced partial encroachment. Again, the location marker 220c is sufficient to cause the probe tip 230 to produce a "1" signal. Consequently, the probe tip 230 produces a "1" signal, which, in combination with earlier signals, so far could still represent the true address of only the lower location.

Then, the probe tip 230 concurrently encounters location markers 220d, 320d. The location marker 220d enters the right-hand side 240r of the scanpath 240, but terminates within the scanpath 240 instead of exiting the left-hand side 240l. The location marker 320d enters the left-hand side 240l of the scanpath 240, but terminates within the scanpath 240 instead of exiting the right-hand side 240r. This is another balanced partial encroachment. As before, either location marker 220d, 320d would be sufficient to cause the probe tip 230 to produce a "1" signal, so the two location markers 220d, 320d are sufficient to cause the probe tip 230 to produce a "1" signal. The lower location continues to be truly represented.

Then, the probe tip 230 encounters two empty bit fields 220e, 320e and produces a resulting "0" signal. The lower location continues to be truly represented.

Now comes the problem. The probe tip 230 next encounters the empty bit field 220f and the location marker 320f. The location marker 320f enters the left-hand side 240l of the scanpath 240, but terminates within the scanpath 240 instead of exiting the right-hand side 240r. For purposes of the present invention, this arrangement is called a "left-side unbalanced partial encroachment". The location marker 320f is sufficient to cause the probe tip 230 to produce a "1" signal and scanning ceases.

The probe tip 230 has produced the following signal: "1," "1," "1," "1," "0" and "1." Recalling that the true address of the upper location is represented by "1," "1," "1," "1," "0" and "0" signal and that the true address of the lower location is represented by "1," "1," "1," "1," "0" and "1," it is easy to see that "1," "1," "1" "1," "0, " and "1" contains an encoding error and consequently represents neither the upper location nor the lower location (and may not represent any location on the entire probe tip locator 210).

The source of this encoding error is the existence, in the scanpath 240, of unbalanced partial encroachments into both sides of the scanpath 240 (both a right-hand unbalanced partial encroachment, e.g., caused by the location marker 220b, and a left-hand unbalanced partial encroachment, caused by the location marker 320f).

The present invention addresses (so to speak) this problem in at least two ways. Two alternative ways will now be described in conjunction with FIGS. 4–6.

Figure 4:
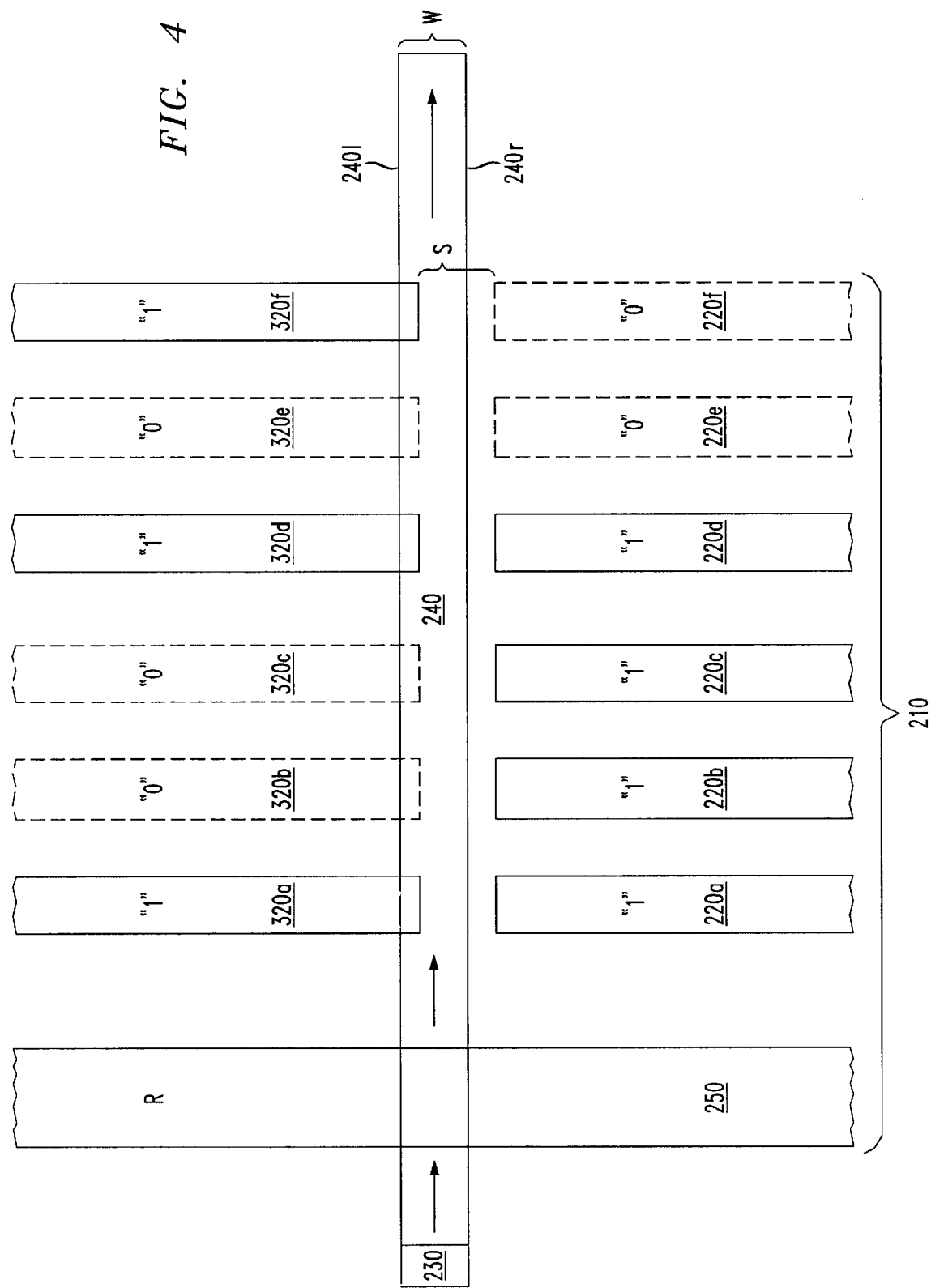
FIG. 4 illustrates an embodiment of a probe tip locator constructed according to the principles of the present invention in which sets of location markers are spaced-apart to avoid unbalanced partial encroachments.

Turning now to FIG. 4, illustrated is an embodiment of a probe tip locator constructed according to the principles of the present invention in which the sets of location markers are spaced-apart to avoid unbalanced partial encroachments. Specifically, the location markers 220a, 220b, 2220c, 220d are spaced-apart (vertically as shown) from the location markers 320a, 320d, 320f. The distance by which the sets of location markers are spaced-apart is illustrated as being "s." The distance s is preferably at least equal to the width of the scanpath 240, such that it becomes impossible for the scanpath 240 to straddle both sets of location markers. The distance s may be greater than the width of the scanpath 240 to accommodate any variation that may occur due to manufacturing imperfections. The distance s may be less of the scanpath 240, but at the ever-growing risk of straddling normally adjacent sets in adjacent locations and encountering unbalanced partial encroachments into both sides of a given scanpath.

Turning now to FIG. 5, illustrated is a list, generally designated 500, of location addresses ordered to avoid opposing state transitions (both 0→1 transitions and 1→0 transitions) between corresponding bit fields of adjacent addresses. FIG. 5 sets forth the heretofore-described sets of bit fields in more abstract terms and over a larger area of a given probe tip locator. The location addresses have an important property: while any given pair of location addresses that are vertically adjacent inevitably change in value (meaning that one or more bits transition from 0→1 or 1→0), those vertically adjacent location addresses do not evidence both 0→1 transitions and 1→0 transitions. For example, with respect to one arbitrary pair of vertically adjacent location addresses (an upper address 510 and a lower address 520) , a 0→1 transition in the "32s" place occurs from the upper address 510 to the lower address 520, but no 1→0 transition is evidenced from the upper address 510 to the lower address 520. With respect to another arbitrary pair of vertically adjacent location addresses (an upper address 530 and a lower address 540), a 1→0 transition in the "8s" place occurs from the upper address 530 to the lower address 540, but no 0→1 transition is evidenced from the upper address 530 to the lower address 540.

If one inspects the entire list 500, one will discover that this is the case for every vertically adjacent location address. Opposing unbalanced partial encroachments cannot occur assuming that the scanpath is horizontal. The number of transitions does not matter, only that they not be opposing.

Figure 6:
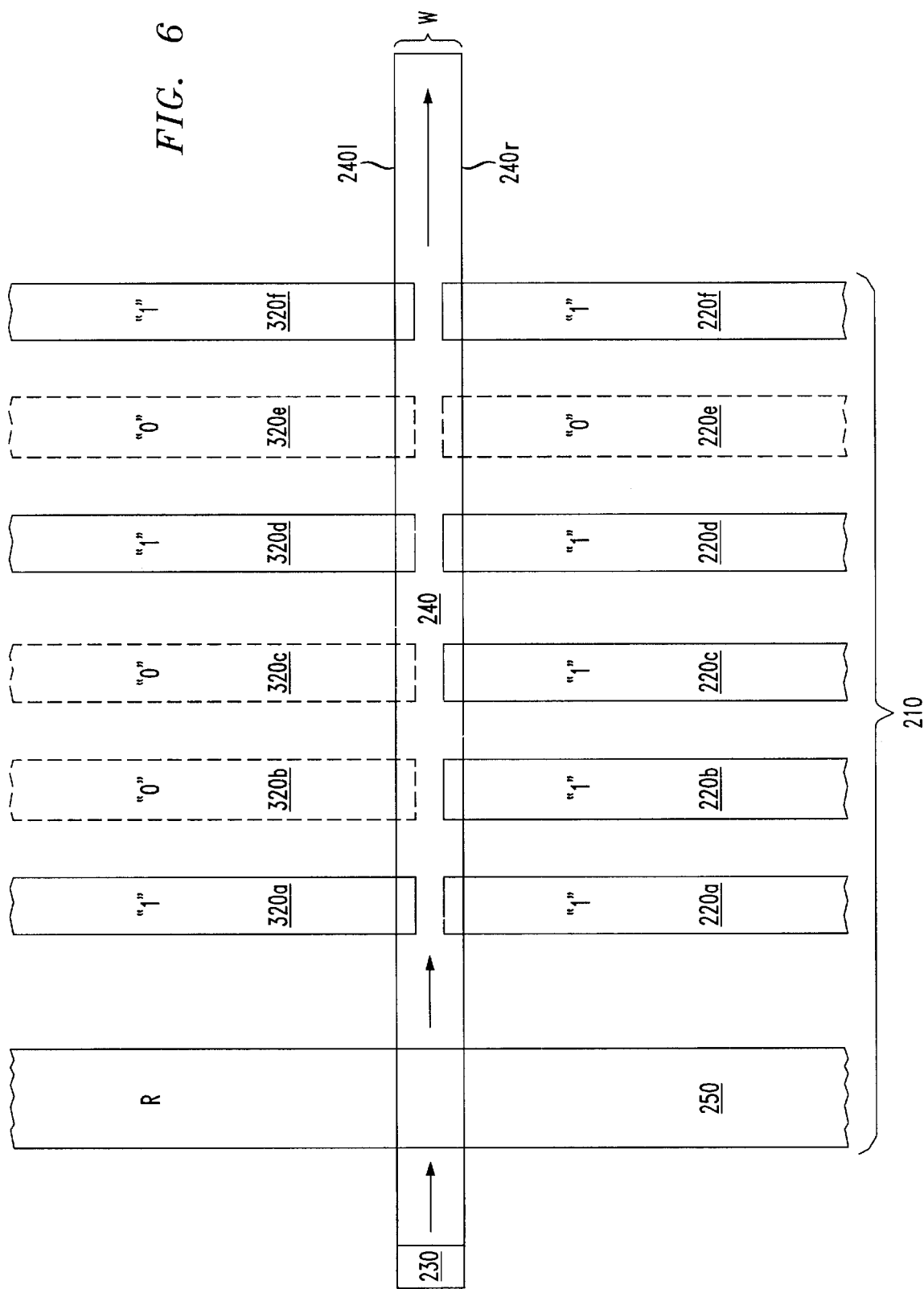
FIG. 6 illustrates another embodiment of a probe tip locator constructed according to the principles of the present invention in which location addresses are ordered to avoid opposing state transitions between corresponding bit fields of locations normally adjacent all possible scanpaths.

Turning now to FIG. 6, illustrated is another embodiment of a probe tip locator 210 constructed according to the principles of the present invention in which location addresses are ordered to avoid opposing state transitions between corresponding bit fields of locations normally adjacent all possible scanpaths. As the probe tip 230 moves left to right along the scanpath 240, right side unbalanced partial encroachments occur with respect to the markers 220b, 220c, but no left-side unbalanced partial encroachments occur due to the fact that the location addresses embodied in the sets in the upper and lower locations have been selected to eliminate such possibility (in accordance with the principles set forth with respect to FIG. 5).

Those skilled in the pertinent art will readily perceive that the present invention is not limited to locating microscope probe tips relative to monolithic probe tip locator structures and IC samples to be tested. For this reason, "probe tip" is defined broadly to include any sensor capable of reading a probe tip locator; and "probe tip locator" is defined broadly to include any arrangement of markers on any surface or in any space wherein the arrangement of markers indicates locations on the surface or in the space. Following are three examples of how the present invention can be employed in entirely different environments.

In a first example, if the probe tip is a sensor (perhaps optical or magnetic) mounted on an automobile and the probe tip locator takes the form of markers laid over or embedded in a roadway, one skilled in the pertinent art will see that the present invention can be employed to locate the automobile relative to the roadway. This not only allows navigational systems onboard the automobile to determine at what point along the roadway the automobile is (for acceleration and braking purposes), but can also assist steering control systems onboard the automobile in steering the automobile side-to-side, thereby enabling automatic steering, turning and lane-changing.

In a second example, if the probe tip is a sensor mounted on a robot (perhaps of the corporate mail-delivery type) and the probe tip locator takes the form of markers laid over or embedded in elevators, hallways and offices, one skilled in the pertinent art will see that the present invention can be employed to locate the robot relative to those elevators, hallways and offices. This allows the robot to know affirmatively and unambiguously where it is in a given building at any time without having to resort to inertial guidance or more sophisticated machine vision technology.

In a third example, if the probe tip is a sensor mounted on a box-printing apparatus (perhaps toward the end of an assembly line) and the probe tip locator takes the form of markers printed on boxes that pass by the apparatus on a conveyor belt, one skilled in the pertinent art will see that the present invention can be employed to locate the apparatus relative to those boxes. This allows the apparatus to print on the boxes appropriately without having to resort to machine vision technology.

Although the present invention has been described in detail, those skilled in the art should understand that they can make various changes, substitutions and alterations herein without departing from the spirit and scope of the invention in its broadest form.

What is claimed is:

1. A probe tip locator for use in determining a location of a probe tip relative to said probe tip locator, comprising:
sets of discrete location markers in which numbers and positions of said location markers in each of said sets are employable uniquely to identify corresponding specific locations on said probe tip locator, said gets being distributed about said probe tip locator to avoid unbalanced partial encroachments into both sides of a scanpath of said probe tip by location markers in sets normally adjacent said scanpath thereby to prevent an erroneous determination of location caused by unbalanced partial encroachments of said location markers into both sides of said scanpath as said probe tip traverses said scanpath.

2. The probe tip locator as recited in claim 1 wherein said location is a Cartesian location.

3. The probe tip locator as recited in claim 1 further comprising reference markers distributed about said probe tip locator at predetermined ordinal locations thereon.

4. The probe tip locator as recited in claim 1 wherein said location markers are bit fields.

5. The probe tip locator as recited in claim 1 wherein said sets of discrete location markers are first sets of discrete location markers, said probe tip locator further comprising second sets of discrete location markers cooperate with said first sets of location markers uniquely to identify two-dimensional specific locations on said probe tip locator.

6. The probe tip locator as recited in claim 1 wherein said scanpath is linear.

7. The probe tip locator as recited in claim 1 wherein discrete markers are embodied in a structure on a monolithic substrate.

8. A method of determining a location of a probe tip relative to a probe tip locator, comprising:
distributing sets of discrete location markers, in which numbers and positions of said location markers in each of said sets are employable uniquely to identify corresponding specific locations on said probe tip locator, about said probe tip locator to avoid unbalanced partial encroachments into both sides of a scanpath of said probe tip by location markers in sets normally adjacent said scanpath; and
scanning said probe tip locator with said probe tip, said distributing preventing an erroneous determination of location caused by unbalanced partial encroachments of said location markers into both sides of said scanpath as said probe tip traverses said scanpath.

9. The method as recited in claim 8 wherein said location is a Cartesian location.

10. The method as recited in claim 8 further comprising distributing reference markers about said probe tip locator at predetermined ordinal locations thereon.

11. The method as recited in claim 8 wherein said location markers are bit fields.

12. The method as recited in claim 8 wherein said sets of discrete location markers are first sets of discrete location markers, said method further comprising distributing second sets of discrete location markers about said probe tip locator, said second sets of discrete location markers cooperating with said first sets of location markers uniquely to identify two-dimensional specific locations on said probe tip locator.

13. The method as recited in claim 8 wherein said scanpath is linear.

14. The method as recited in claim 8 wherein discrete markers are embodied in a structure on a monolithic substrate.

15. A system for determining a location of a probe tip relative to a monolithic circuit to be scanned, comprising;
a scanning probe microscope having a probe and a stage, said probe having a probe tip, said stage having a receptacle for holding said monolithic circuit to be scanned; and
a probe tip locator connected to said stage in fixed relation relative to said receptacle and including sets of discrete location markers in which numbers and positions of said location markers in each of said sets are employable uniquely to identify corresponding specific locations on said probe tip locator, said sets being distributed about said probe tip locator to avoid unbalanced partial encroachments into both sides of a scanpath of said probe tip by location markers in sets normally adjacent said scanpath thereby to prevent an erroneous determination of location caused by unbalanced partial encroachments of said location markers into both sides of said scanpath as said probe tip traverses said scanpath.

16. The wafer as recited in claim 15 wherein said location is a Cartesian location.

17. The wafer as recited in claim 15 wherein said probe tip locator further includes reference markers distributed about said probe tip locator at predetermined ordinal locations thereon.

18. The wafer as recited in claim 15 wherein said location markers are bit fields.

19. The wafer as recited in claim 15 wherein said sets of discrete location markers are first sets of discrete location markers, said probe tip locator further comprising second sets of discrete location markers cooperate with said first sets of location markers uniquely to identify two-dimensional specific locations on said probe tip locator.

20. The wafer as recited in claim 15 wherein said scanpath is linear.

21. The wafer as recited in claim 15 wherein discrete markers are embodied in a structure on a monolithic substrate.

* * * * *